US009062243B2

(12) United States Patent
Salgaonkar et al.

(10) Patent No.: US 9,062,243 B2
(45) Date of Patent: Jun. 23, 2015

(54) ALKALINE PERSULFATE FOR LOW-TEMPERATURE BREAKING OF MULTI-CHAIN POLYMER VISCOSIFIED FLUID

(75) Inventors: Lalit P. Salgaonkar, Pune (IN); Achala V. Danait, Pune (IN); Ian D. Robb, Lawton, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 34 days.

(21) Appl. No.: 13/166,442

(22) Filed: Jun. 22, 2011

(65) Prior Publication Data

US 2012/0325482 A1 Dec. 27, 2012
US 2013/0133890 A2 May 30, 2013

(51) Int. Cl.
*C09K 8/00* (2006.01)
*C09K 8/68* (2006.01)
*B08B 9/02* (2006.01)

(52) U.S. Cl.
CPC ... *C09K 8/68* (2013.01); *B08B 9/02* (2013.01); *C09K 8/685* (2013.01); *C09K 2208/26* (2013.01)

(58) Field of Classification Search
CPC .......... C09K 8/00; E21B 33/138; E21B 43/04
See application file for complete search history.

(56) References Cited

U.S. PATENT DOCUMENTS

| 4,144,179 | A | * | 3/1979 | Chatterji | 507/211 |
|---|---|---|---|---|---|
| 4,313,834 | A | * | 2/1982 | Harris | 507/215 |
| 4,553,601 | A | * | 11/1985 | Almond et al. | 166/308.5 |
| 4,560,486 | A | * | 12/1985 | Hinkel | 507/211 |
| 5,225,506 | A | * | 7/1993 | Ahmed et al. | 526/258 |
| 6,987,083 | B2 | | 1/2006 | Phillippi et al. | |
| 7,814,980 | B2 | | 10/2010 | Bryant et al. | |
| 2002/0189810 | A1 | * | 12/2002 | DiLullo et al. | 166/294 |
| 2003/0114539 | A1 | * | 6/2003 | Weaver et al. | 516/53 |
| 2004/0206498 | A1 | * | 10/2004 | Phillippi et al. | 166/278 |
| 2005/0061504 | A1 | * | 3/2005 | Frost et al. | 166/279 |
| 2006/0247135 | A1 | * | 11/2006 | Welton et al. | 507/213 |
| 2008/0176770 | A1 | * | 7/2008 | Sanders et al. | 507/213 |
| 2010/0081586 | A1 | * | 4/2010 | Smith et al. | 507/213 |
| 2011/0059883 | A1 | | 3/2011 | Swazey, Jr. et al. | |

FOREIGN PATENT DOCUMENTS

EP 1267034 A2 12/2002

OTHER PUBLICATIONS

International Search Report for PCT/2012/042187 issued Jan. 24, 2013.
ISR Written Opinion for PCT/2012/042187 issued Jan. 24, 2013.

* cited by examiner

*Primary Examiner* — Zakiya W Bates
*Assistant Examiner* — Silvana Runyan
(74) *Attorney, Agent, or Firm* — Holly Scehnge; Baker Botts L.L.P.

(57) ABSTRACT

A persulfate compound activated by a strong base is used for low-temperature breaking of fluids viscosified with a multi-chain polysaccharide. The breaker system can be used in an oilfield or pipeline application where a multi-chain polysaccharide may be used in a fluid. It is particularly useful at low temperatures of less than 100° F. Optionally, the water can be a brine.

5 Claims, No Drawings

ALKALINE PERSULFATE FOR LOW-TEMPERATURE BREAKING OF MULTI-CHAIN POLYMER VISCOSIFIED FLUID

CROSS-REFERENCE TO RELATED APPLICATIONS

Not applicable.

BACKGROUND

1. Technical Field

The inventions are in the field of producing crude oil or natural gas and to pipeline transmission of oil or gas.

2. Background Art

Water-Soluble Polymers Used in Treatment Fluids

Common water-soluble polymers used in well treatment fluids include polysaccharides and synthetic polymers.

As used herein, a "polysaccharide" can broadly include a modified or derivative polysaccharide. As used herein, "modified" or "derivative" means a compound or substance formed by a chemical process from a parent compound or substance, wherein the chemical skeleton of the parent is retained in the derivative. Substitution is an example of a modification or derivatization process. Substitution on a polymeric material may be partial or complete.

A polymer can be classified as being single chain or multi chain, based on its solution structure in aqueous liquid media. Examples of single-chain polysaccharides that are commonly used in the oilfield industry include guar, guar derivatives, and cellulose derivatives. Guar polymer, which is derived from the beans of a guar plant, is referred to chemically as a galactomannan gum. Examples of multi-chain polysaccharides include xanthan, diutan, and scleroglucan, and derivatives of any of these. Without being limited by any theory, it is currently believed that the multi-chain polysaccharides have a solution structure similar to a helix or are otherwise intertwined.

Xanthan gum (commonly referred to simply as xanthan) is a polysaccharide, derived from the bacterial coat of *Xanthomonas campestris*. It is produced by fermentation of glucose, sucrose, or lactose by the *Xanthomonas campestris* bacterium. Diutan gum (commonly referred to simply as diutan) is another multi-chain polysaccharide that is sometimes used to increase viscosity in well fluids.

An example of a water-soluble synthetic polymer that is commonly used in wells is polyacrylamide or derivative of polyacrylamide. Certain polyacrylamides or derivatives can be classified as multi-chain polymers.

Potential Sources of Water for Use in Treatment Fluids

Non-freshwater sources of water for use in well treatment fluids can include surface water ranging from brackish water to seawater, brine, returned water (sometimes referred to as flowback water) from the delivery of a well fluid into a well, unused well fluid, and produced water. As used herein, a brine refers to a water having at least 40,000 mg/L total dissolved solids.

Another potential source of water for use in well treatment fluids can include push pills, that is, slugs of water that have been viscosified with a multi-chain polysaccharide used to push fluids to clean out an oil or gas transmission pipeline located at or near the surface of the ground or seafloor.

In some cases, however, a flowback water can have an undesirably high viscosity due to a residual viscosity-increasing polymer, which may or may not be cross-linked, that was not completely broken in the well before flowing back. Similarly, a push pill can have an undesirably high viscosity for use in a well treatment fluid. To use such a flowback water or push pill in forming another well treatment fluid, it may be necessary to break the residual viscosity.

Breaker for Polysaccharide or Crosslinked Polysaccharide

Reducing the viscosity of a viscosified fluid is referred to as "breaking" the fluid. Chemicals used to reduce the viscosity of fracturing fluids are called breakers. Other types of viscosified well fluids also need to be broken for removal from the wellbore or subterranean formation.

No particular mechanism is necessarily implied by the term "breaking." For example, in the case of a crosslinked viscosity-increasing agent, for example, one way to diminish the viscosity is by breaking the crosslinks. By way of another example, a breaker can reduce the molecular weight of a water-soluble polymer by cutting the long polymer chain. As the length of the polymer chain is cut, the viscosity of the fluid is reduced. This process can occur independently of any crosslinking bonds existing between polymer chains.

Breakers must be selected to meet the needs of each situation. First, it is important to understand the general performance criteria of breakers. For example, in reducing the viscosity of a fracturing fluid or gravel packing fluid to a near water-thin viscosity, the breaker must maintain a critical balance. Premature reduction of viscosity during the pumping of the treatment fluid can jeopardize the treatment. Inadequate reduction of fluid viscosity after pumping can also reduce production if the required conductivity is not obtained.

Chemical breakers used to reduce viscosity of a fluid viscosified with a viscosifying polymer, such as guar and derivatized guar polymers, used in fracturing or other subterranean applications are generally grouped into three classes: oxidizers, enzymes, and acids. All of these materials reduce the viscosity of the fluid by breaking the polymer chain. The breakers operate by cleaving the backbone of polymer either by hydrolysis of acetyl group, cleavage of glycosidic bonds, oxidative/reductive cleavage, free radical breakage or combination of these processes. A breaker should be selected based on its performance in the temperature, pH, time, and desired viscosity profile for each specific treatment.

Fluids viscosified with a multi-chain polysaccharide can be more difficult to break than fluids viscosified with a single-chain polysaccharide. In particular, there are few methods available to break the fluid viscosity of a fluid viscosified with a multi-chain polysaccharide at low temperatures (below 120° F. or 49° C.), and they suffer from various problems. For example, the use of hypochlorite poses corrosion concerns and may not provide sufficient delay of the break. The current use of persulfate requires high concentrations at lower temperatures. The use of oxidizers such as sodium chlorite is limited to high-temperature applications and may react violently to cause a fire when reducing agents are used in the process. Enzymes do not work well on multi-chain polysaccharides such as xanthan at low temperatures.

Sodium perborate and ethyl acetoacetate ("EAA") have been reported as being capable of breaking the viscosity of a fluid viscosified with a typical xanthan gum ("XANVIS") down to 80° F. (27° C.). See Kelco Oilfield Group in its Technical Bulletin entitled "Breaker Applications," revised January 2004. However, Halliburton previously reported that it was unable to break a fluid viscosified with xanthan at very low temperature using the published recipe and the publication does not provide sufficient detail to allow the user to optimize the breaker recipe for a given set of conditions. U.S. Patent Publication No. US 2008/0176770 A1, published Jul. 24, 2008, having for named inventors Michael W. Sanders, et al., which is incorporated by reference in its entirety.

A treatment fluid for use in a well can optionally comprise an activator or a retarder to, among other things, optimize the break rate provided by a breaker. Previously known examples of such activators include acid generating materials, chelated iron, copper, cobalt, and reducing sugars. Previously known examples of retarders include sodium thiosulfate, methanol, and diethylenetriamine.

SUMMARY OF THE INVENTION

According to an embodiment of the invention, a persulfate compound activated by a strong base can be used for low-temperature breaking of a fluid viscosified with a multi-chain polysaccharide. The breaker system according to the invention can be used in an oilfield or pipeline application where a multi-chain polysaccharide is in a fluid having an undesirably high viscosity. It is particularly useful at low and very low temperatures.

The features and advantages of the present invention will be apparent to those skilled in the art. While numerous changes may be made by those skilled in the art, such changes are within the spirit of the invention.

DETAILED DESCRIPTION OF PRESENTLY PREFERRED EMBODIMENTS AND BEST MODE

General Definitions and Usages

As used herein, the words "comprise," "have," "include," and all grammatical variations thereof are each intended to have an open, non-limiting meaning that does not exclude additional elements or steps.

As used herein, if not otherwise specifically stated, the physical state (e.g., solid or fluid) of a substance (or mixture of substances) and other physical properties are determined at a temperature of 77° F. (25° C.) and a pressure of 1 atmosphere (Standard Laboratory Conditions) under no shear.

Most well fluids are non-Newtonian fluids. Accordingly, the apparent viscosity of a fluid applies only under a particular set of conditions including shear stress versus shear rate, which must be specified or understood from the context. Unless otherwise specified, as used herein the apparent viscosity of a fluid (excluding any suspended solid particulate larger than silt) is measured with a Fann Model 35 type viscometer at a shear rate of 511 1/s and at 77° F. (25° C.) and a pressure of 1 atmosphere. Apparent viscosity is reported in units of centipoise (cP). For reference, the viscosity of pure water is 1 cP. In the oilfield and as used herein, unless the context otherwise requires it is understood that "viscosity" is actually a reference to apparent viscosity.

As used herein, if not otherwise specifically stated, a material is considered to be "soluble" in a liquid if at least 10 grams of the material can be dissolved in one liter of the liquid when tested at 77° F. and 1 atmosphere pressure for 2 hours and considered to be "insoluble" if less soluble than this. As will be appreciated by a person of skill in the art, the solubility in water of a certain material may be dependent on the salinity, pH, or other additives in the water. Accordingly, the salinity, pH, additive selection of the water can be modified to facilitate the solubility in aqueous solution.

Unless otherwise specified, any doubt regarding whether units are in U.S. or Imperial units, where there is any difference U.S. units are intended herein. For example, "gal/Mgal" means U.S. gallons per thousand U.S. gallons.

As used herein, "first," "second," or "third" may be arbitrarily assigned and are merely intended to differentiate between two or more fluids, aqueous solutions, etc., as the case may be, that may be used according to the invention. Accordingly, it is to be understood that the mere use of the term "first" does not require that there be any "second," and the mere use of the word "second" does not require that there be any "third," etc. Further, it is to be understood that the mere use of the term "first" does not require that the element or step be the very first in any sequence, merely that it is at least one of the elements or steps. Similarly, the mere use of the terms "first" and "second" does not necessarily require any sequence, for example, a "first" is not required to precede a "second." In addition, the mere use of such terms does not exclude intervening elements or steps between the "first" and "second" elements or steps, etc.

General Purposes and Applications of the Invention

Fluids viscosified with a multi-chain polysaccharide are very commonly used in gravel packing operations, sometimes in fracturing operations, and occasionally in other well treatments. Examples of multi-chain polysaccharide include diutan, scleroglucan, and xanthan.

There are some situations where it would be valuable to be able to break a fluid viscosified with a multi-chain polysaccharide at low temperatures. Surface or near surface applications at temperatures typically below 100° F., include, for example:

(a) breaking a flow-back fluid from a well, in which a multi-chain polysaccharide was used to increase viscosity of a well fluid used in the well.

(b) breaking unused well fluids that were viscosified with a multi-chain polysaccharide but not actually introduced into the well. This occurs, for example, when all the made-up fluid was not actually needed.

(c) breaking of push pills, that is, where a slug viscosified with a multi-chain polysaccharide is used to push fluids to clean out an oil or gas transmission pipeline located at or near the surface of the ground or seafloor.

Surface applications would be conveniently performed on or near the well site. Such applications would be more economical if it were not necessary to heat the fluid to effect the break of undesired viscosity.

Downhole well applications at temperatures that can be below 100° F., include, for example: (a) gravel pack fluids used in shallow wells; and (b) push pills, for example as a slug, to push other fluids in a well or subterranean formation.

Such downhole applications would be more economical if it were not necessary to heat the well fluid to effect the break of undesired viscosity.

For example, in some well applications, it is desirable to have a delayed break of the fluid viscosified with a multi-chain polysaccharide in the well at less than 100° F.

Multi-chain polysaccharides are typically more difficult to break than single-chain polysaccharides. This is especially a problem at low temperatures. Generally, to break fluid viscosified with polysaccharide requires the generation of a certain number of cleavages in the polymer backbone so as to break the polymer and cause the desired reduction in viscosity of the fluid. The multi-chain polysaccharides require more cleavages of the polymer backbone than for a single-chain polysaccharide to break the viscosity.

It is known in the art, however, that the effectiveness of an oxidizer for breaking a polysaccharide decreases with decreasing temperature. Various oxidizer systems are available to break a fluid viscosified with xanthan at high and even moderate temperatures; however, most of them cannot achieve similar breaking results at low temperatures, which in this context means less than 100° F. Known oxidizers are essentially ineffective for this purpose at low temperatures of less than 100° F.

For example, oxidizers such as hypochlorites are commonly used to break viscosified fluids at moderate or higher temperatures, in this context meaning greater than 100° F. However, at low temperatures below 100° F., their activity is low. Hence, high concentrations and excessive volumes of hypochlorites are required for initiating the breaking action. Even in these situations, it is difficult to achieve viscosities comparable to those of water (1.0 cP), which is the ideal objective. In field applications where large quantities of fluid viscosified with xanthan are required to be broken, using enormous quantities of hypochlorite breakers becomes highly impractical and expensive.

In cases where a delayed break is desired, such as a downhole well application, at moderate temperatures above 100° F. (38° C.) and higher, this can be achieved by a reduction of the concentration of the oxidizer. However, there is a limit to the degree to which the concentration of the oxidizer can be reduced because, as noted above, there are a certain number of cleavages in the polymer backbone that are necessary to achieve the desired reduction in viscosity.

Therefore, especially at low or very low temperatures, to achieve a delayed break, a control mechanism other than the concentration of strong oxidizer alone is necessary.

A prior invention for Halliburton discloses the method of using a composition comprising of water, a source of hydrogen peroxide (e.g., sodium perborate), and an activator for the source of hydrogen peroxide to break viscosified fluids used for treating portions of wellbore or formation at temperatures below 100° F. US patent Publication No. US 2008/0176770 A1, published Jul. 24, 2008, having for named inventors Michael W. Sanders, Jeffrey L. Mundy, Fong Fong Foo, and Rajesh K. Saini, entitled "Compositions & Methods for breaking a viscosity increasing polymer at very low temperature used in downhole well applications," is incorporated by reference in its entirety.

The purpose of this invention is to provide a breaker system that can effectively break a fluid viscosified with a multi-chain polysaccharide. The method is especially useful at low temperatures, which in this context means at less than 100° F. Preferably, a breaker system should be able to effectively break such multi-chain polysaccharides at very low temperatures, which in this context means at less than 90° F. Other oxidizing systems such as peroxides with catalysts have been used though with little success at low temperatures, and especially at very low temperatures. Another purpose is to provide a breaker system that is simple to use and inexpensive.

It has been discovered that a persulfate compound activated by a strong base can break a fluid viscosified with a multi-chain polysaccharide at low and very low temperatures.

A breaker system according to the invention can be used in an oilfield or pipeline application where a multi-chain polysaccharide may be used in a fluid. It is particularly useful at low and very low temperatures.

A commonly used multi-chain viscosity-increasing polysaccharide is xanthan. For example, xanthan is typically used in the range of from about 0.25% to about 1.5% by weight of the water in well fluids. Xanthan is being used, for example, in low-temperature gravel pack and frac-pack applications. For example, 0.2% xanthan exhibits some elasticity, and elasticity is expected to be observable down to about 0.1% by weight xanthan in water. Any returned fluid from a well or any unused well fluid exhibiting viscosity greater than 5 cP would be a candidate for low-temperature breaking of the fluid before other use, particularly for other use in a well or disposal.

An added advantage of this breaker system is the use of small relative volumes, which makes this system attractive and practical for field conditions. The breaker system can be a simple and inexpensive two-component system.

Another advantage of the compositions and methods according to the invention is the ability to break a fluid viscosified with a multi-chain polysaccharide in a controlled manner at low temperature or very low temperature, that is, the rate of degradation of the polymer is not immediate and can be relatively slow. The rate of degradation of the fluid can be controlled, including by varying the concentration of persulfate or the mole ratio of persulfate to alkali.

The presently most preferred embodiment uses a simple two-component breaker system comprising sodium persulfate and sodium hydroxide. This breaker system can break a fluid of 60 lb/Mgal xanthan to a very low viscosity of 3 cP or less at 85° F. within a very short time of 24 hrs.

Without being limited by any theory, it is believed that the persulfate anion can be induced to form a sulfate free radical, which has an estimated redox potential of 2.6 V. These species can then initiate a free radical reaction to affect the breaking of viscosified fluids. According to the breaker system of the present invention, combination of the persulfate and the alkali generates free radicals that can break xanthan.

The apparent viscosity of the fluid to be broken is greater than 5 cP. Preferably, the apparent viscosity of the fluid to be broken is greater than 10 cP. More preferably, the apparent viscosity of the fluid to be broken is in the range of 10 cP to 50 cP.

Preferably the multi-chain polysaccharide is present in at least 0.24% by weight of the water (20 lb/Mgal) in the fluid, and more preferably in the range of 0.24% by weight of the water (20 lb/Mgal) to about 1% by weight of the water (about 80 lb/Mgal).

The persulfate is present in a sufficient concentration to break the viscosity of a fluid comprising water and the multi-chain polysaccharide. The concentration of the persulfate and the strong base can be adjusted to help control the break times. For example, the persulfate is preferably present in at least about 0.4% by weight (about 30 lb/Mgal) of the water, and more preferably in the range of about 0.5% by weight (about 40 lb/Mgal) to about 3% by weight (about 250 lb/Mgal) of the water of the fluid to be broken.

A well fluid according to the invention is preferably injected at a temperature of less than 150° F. (65° C.). This temperature range is within the normal ambient temperature range at the wellhead and avoids any need for heating the treatment fluid. The treatment fluid has particular application when injected at a temperature below 100° F. (38° C.). The treatment fluids and methods according to the invention are especially useful at low temperatures, at which fluids viscosified with xanthan are more difficult to break, such as where the design temperature of the subterranean formation is less than 100° F. (38° C.).

In addition, it is presently believed that this breaker system of persulfate and strong base would work on other water-soluble polymers. More particularly, it is presently expected that this breaker system would be effective to break water-soluble synthetic polymers, such as those used as friction reducers in well fluids. Still more particularly, it is presently expected that this breaker system would be effective to break a fluid of a water-soluble polyacrylamide or derivative thereof.

Surface or Subsurface Applications

According to an embodiment, methods are provided for breaking the viscosity of a fluid having an apparent viscosity greater than 5 cP, wherein the viscous fluid comprises a multi-chain polysaccharide in water. The method includes the step of contacting the viscous fluid with: (i) one or more water-soluble persulfates; and (ii) one or more strong bases. Preferably, the step of contacting is at one or more temperatures less than 150° F. More preferably, the step of contacting is at one or more temperatures less than 100° F.

The methods are useful at very low temperatures, wherein the step of contacting is at one or more temperatures less than 90° F. Most preferably, the step of contacting is at one or more temperatures less than 80° F.

As discussed in more detail, the methods are useful in several applications, including, for example, treating of flowback water, unused treatment fluid, pipeline cleaning, etc.

Preferably, the step of contacting further involves mixing. The mixing can be by any convenient technique.

The one or more water-soluble persulfates can be used in any convenient form, such as solid particulate or pre-dissolved in an aqueous solution. Similarly, the one or more strong bases can be used in any convenient form, such as solid particulate or pre-dissolved in an aqueous solution.

Preferably, the step of contacting does not dilute the fluid more than 10 percent by volume. More preferably, the step of contacting does not dilute the fluid more than 5 percent by volume.

The fluid to be broken can be of various sources or types. Most commonly, it is expected that the fluid to be broken will be one in which the continuous phase of the fluid comprises the multi-chain polysaccharide in water. Advantageously, the water can be a brine.

In an embodiment, the multi-chain polysaccharide is in at least a sufficient concentration in the water such that the fluid to be broken has a viscosity greater than 5 cP. Preferably, the apparent viscosity of the fluid to be broken is greater than about 10 cP. More preferably, the apparent viscosity of the fluid to be broken is in the range of about 10 cP to about 50 cP. For example, a fluid of 20 lb/Mgal xanthan in tap water shows 10 cP apparent viscosity as measured with a Fann 35 viscometer at 300 rpm (511 sec-1 shear rate).

In an embodiment, the multi-chain polysaccharide is xanthan.

Preferably, the one or more persulfates are in a weight ratio of at least 0.5 to 1 of the multi-chain polysaccharide in the fluid. In another embodiment, the one or more persulfates are in a concentration of at least 30 lb/Mgal of the viscous fluid.

Preferably, the one or more persulfates are selected from the group consisting of sodium persulfate, potassium persulfate, ammonium persulfate, and any combination thereof. More preferably, the one or more persulfates are selected from the group consisting of sodium, potassium persulfate, and any combination thereof.

In an embodiment, the one or more strong bases are in a mole ratio based on hydroxide of at least 0.5 to 1 of the one or more persulfates.

Preferably, the one or more strong bases are selected from the group consisting of sodium hydroxide, potassium hydroxide, sodium carbonate, potassium carbonate and any combination thereof. Most preferably, the one or more strong bases are selected from the group consisting of sodium hydroxide, potassium hydroxide, and any combination thereof.

Delayed Break in Well Fluid Application

According to another embodiment, methods are provided of treating a well, wherein the methods include the steps of: (a) forming a treatment fluid comprising: (i) water; and (ii) one or more multi-chain polysaccharides, wherein the multi-chain polysaccharides are in at least a sufficient concentration in the water such that the first treatment fluid has a viscosity of at least 5 cP; (iii) one or more persulfates; and (iv) one or more strong bases; and (b) introducing the treatment fluid into the well and directing the treatment fluid to a portion of the well. Preferably, the portion of the well has a design temperature less than 150° F. More preferably, the portion of the well has a design temperature less than 100° F.

The methods are useful at very low temperatures, wherein the portion of the well is has a design temperature less than 90° F. Most preferably, the portion of the well has a design temperature greater than 70° F.

Preferably, the water is of any convenient source that does not have any component that would interfere with the chemistry of hydrating the polysaccharide, the chemistry of the breaking, the intended use of the viscosified treatment fluid, or the use of the fluid after breaking.

Preferably, the methods further include the steps of: (a) after the step of introducing, allowing the treatment fluid to break in the portion of the well; and then (b) flowing back from the well.

The treatment fluid can further include proppant or gravel.

The step of introducing the treatment fluid can further include introducing above the fracture pressure of the subterranean formation.

The step of introducing the treatment fluid can further include: gravel packing, which is below the fracture pressure of the subterranean formation.

Stepwise Well Fluid Application

According to yet another embodiment, methods are provided of treating a well, wherein the method include the steps of: (a) forming a first treatment fluid comprising: (i) water; and (ii) one or more multi-chain polysaccharides, wherein the multi-chain polysaccharides are in at least a sufficient concentration in the water such that the first treatment fluid has a viscosity of at least 5 cP; (b) forming a second treatment fluid comprising: (i) one or more persulfates; and (ii) one or more strong bases; (c) introducing the first treatment fluid into the well; (d) introducing the second treatment fluid into the well; and (e) directing the first treatment fluid and the second treatment fluid to contact each other in a portion of the well. Preferably, the portion of the well has a design temperature less than 150° F. More preferably, the portion of the well has a design temperature less than 100° F.

The methods are useful at very low temperatures, wherein the portion of the well is has a design temperature less than 90° F. Most preferably, the portion of the well is has a design temperature greater than 70° F.

Preferably, the water is of any convenient source that does not have any component that would interfere with the chemistry of hydrating the polysaccharide, the chemistry of the breaking, the intended use of the viscosified treatment fluid, or the use of the fluid after breaking.

Preferably, the method further includes the steps of: (a) after the step of directing the first treatment fluid and the second treatment fluid to contact each other in a portion of the well, allowing the second fluid to break the viscosity of the first fluid in the portion of the well; and then (b) flowing back from the well.

The step of introducing the first treatment fluid into the well can be before the step of introducing the second treatment fluid into the well. In a different embodiment, the step of introducing the first treatment fluid into the well is after the step of introducing the second treatment fluid into the well. Thus, the second treatment fluid comprising the one or more persulfates can be introduced according to an overflush technique or according to a "poison pill" technique.

In an embodiment, the first treatment fluid further comprises proppant or gravel.

In an embodiment, the step of introducing the first treatment fluid further comprises introducing above the fracture pressure of the subterranean formation.

In another embodiment, the step of introducing the first treatment further comprises: gravel packing, which is below the fracture pressure of the formation.

EXAMPLES

General procedure: to a blender jar, add the water and xanthan and allow the xanthan to fully hydrate. Measure the viscosity of the fluid at the start (that is, upon hydration of the xanthan); add the sodium persulfate and the sodium hydroxide; place the test sample in a temperature bath; measure the viscosity over time.

Unless otherwise specified, the water used in these examples is fresh tap water. Sodium persulfate is sometimes reported as simply "persulfate." Sodium hydroxide is sometimes reported as simply "hydroxide."

All temperatures are reported in degrees Fahrenheit (° F.).

In all the experiments, apparent viscosity in centiPoise (cP) was measured on a Fann Model 35 viscometer using R1 rotor, B1 bob, and F1 spring at 300 rpm, equivalent to 511 sec$^{-1}$ shear. Viscosity readings were taken on a ⅕th spring Fann 35 Viscometer. The initial viscosity readings were taken with the viscosified fluid at room temperature (about 77° F.). All other readings were taken with the test sample placed in a temperature bath of the stated temperature. The samples were placed in the temperature bath of the stated temperature. Each day, the bottles were removed from the temperature bath and immediately readings were taken on the Fann 35 viscometer.

Xanthan loading used was a 60 lb/Mgal in fresh tap water or a 9.1 ppg NaCl brine. The initial viscosity of the fluid was 39.0 cP. The persulfate used was sodium persulfate. The hydroxide used was sodium hydroxide. Concentrations of the persulfate are reported in pounds per 1000 gallons (lb/Mgal). Concentrations of the hydroxide concentrations are reported in mole ratio to the persulfate concentration. The fluid was considered to be broken when viscosity of 3.0 cP or less was measured.

For a fluid of 60 lb/Mgal xanthan in tap water at 85° F., Table 1 shows the effect on the break time of varying the mole ratio of hydroxide to persulfate, using a persulfate concentration of 50 lb/Mgal persulfate.

TABLE 1

| Xanthan Loading | Test Temperature | Concentration of Sodium Persulfate | Mole Ratio | | Broken Viscosity | Break Time |
| --- | --- | --- | --- | --- | --- | --- |
| | | | Persulfate | Hydroxide | | |
| 60 lb/Mgal in tap water | 85° F. | 50 lb/Mgal (0.60% w/v) | 1.0 | 0.5 | 3.0 cP | Day 10 (240 hrs) |
| | | | 1.0 | 0.6 | 3.0 cP | Day 8 (192 hrs) |
| | | | 1.0 | 0.7 | 3.0 cP | Day 6 (144 hrs) |
| | | | 1.0 | 0.8 | 3.0 cP | Day 5 (120 hrs) |
| | | | 1.0 | 0.9 | 3.0 cP | Day 4 (96 hrs) |
| | | | 1.0 | 1.0 | 3.0 cP | Day 3 (72 hrs) |
| | | | 1.0 | 1.1 | 2.5 cP | Day 3 (72 hrs) |
| | | | 1.0 | 1.2 | 2.5 cP | Day 3 (72 hrs) |
| | | | 1.0 | 1.3 | 3.0 cP | Day 2 (48 hrs) |
| | | | 1.0 | 1.4 | 2.5 cP | Day 2 (48 hrs) |
| | | | 1.0 | 1.5 | 3.0 cP | Day 1 (24 hrs) |
| | | | 1.0 | 3.0 | 1.5 cP | Day 1 (24 hrs) |
| | | | 1.0 | 4.5 | 1.5 cP | Day 1 (24 hrs) |
| | | | 1.0 | 6.0 | 1.0 cP | Day 1 (24 hrs) |

For a fluid of 60 lb/Mgal xanthan in tap water at 85° F., Table 2 shows the effect on break time of varying the mole ratio of hydroxide to persulfate, using a persulfate concentration of 40 lb/Mgal.

TABLE 2

| Xanthan Loading | Test Temperature | Concentration of Sodium Persulfate | Mole Ratio | | Broken Viscosity | Break Time |
| --- | --- | --- | --- | --- | --- | --- |
| | | | Persulfate | Hydroxide | | |
| 60 lb/Mgal in tap water | 85° F. | 40 lb/Mgal (0.48% w/v) | 1.0 | 0.5 | Unbroken (5.0 cP) after 12 days | |
| | | | 1.0 | 0.6 | 3.0 cP | Day 10 (240 hrs) |
| | | | 1.0 | 0.7 | 3.0 cP | Day 7 (168 hrs) |
| | | | 1.0 | 0.8 | 3.0 cP | Day 5 (120 hrs) |
| | | | 1.0 | 0.9 | 3.0 cP | Day 5 (120 hrs) |
| | | | 1.0 | 1.0 | 3.0 cP | Day 5 (120 hrs) |
| | | | 1.0 | 1.1 | 3.0 cP | Day 4 (96 hrs) |
| | | | 1.0 | 1.2 | 3.0 cP | Day 3 (72 hrs) |
| | | | 1.0 | 1.3 | 2.5 cP | Day 3 (72 hrs) |
| | | | 1.0 | 1.4 | 2.5 cP | Day 3 (72 hrs) |
| | | | 1.0 | 1.5 | 2.5 cP | Day 3 (72 hrs) |

The data in the Tables 1 and 2 show that at a particular temperature and at a particular persulfate concentration, the break times can be controlled by adjusting the concentration of the persulfate and the mole ratio of the hydroxide to the persulfate.

For a fluid of 60 lb/Mgal xanthan in tap water at 85° F., Table 3 shows the effect on break time of varying the concentration of persulfate, keeping a constant mole ratio of hydroxide to persulfate.

TABLE 3

| Xanthan Loading | Test Temperature | Concentration of Sodium Persulfate | Mole Ratio Persulfate | Mole Ratio Hydroxide | Broken Viscosity | Break Time |
|---|---|---|---|---|---|---|
| 60 lb/Mgal in tap water | 85° F. | 30 lb/Mgal (0.36% w/v) | 1.0 | 1.0 | 3.0 cP | Day 8 (192 hrs) |
| | | 40 lb/Mgal (0.48% w/v) | 1.0 | 1.0 | 3.0 cP | Day 5 (120 hrs) |
| | | 50 lb/Mgal (0.60% w/v) | 1.0 | 1.0 | 3.0 cP | Day 3 (72 hrs) |

Data in Table 3 shows that at a particular temperature, break times can be controlled by adjusting the concentration of the persulfate.

For a fluid of 60 lb/Mgal xanthan in tap water, Table 4 shows the effect of varying the temperature on the break time

TABLE 4

| Xanthan Loading | Test Temperature | Concentration of Sodium Persulfate | Mole Ratio Persulfate | Mole Ratio Hydroxide | Broken Viscosity | Break Time |
|---|---|---|---|---|---|---|
| 60 lb/Mgal in tap water | 90° F. | 50 lb/Mgal (0.60% w/v) | 1.0 | 1.0 | 3.0 cP | Day 1 (24 hrs) |
| | 85° F. | | 1.0 | 1.0 | 3.0 cP | Day 3 (72 hrs) |
| | 80° F. | | 1.0 | 1.0 | 3.0 cP | Day 6 (144 hrs) |

Data in Table 4 shows that the activated breaker composition can be used to effectively break fluids viscosified with xanthan at very low temperatures, in this context meaning down to 80° F.

For a fluid of 60 lb/Mgal xanthan in 9.1 ppg NaCl brine at 90° F., Table 5 shows the effect on break time of varying the mole ratio of hydroxide to persulfate, using a persulfate concentration of 50 lb/Mgal.

TABLE 5

| Xanthan Loading | Test Temperature | Concentration of Sodium Persulfate | Mole Ratio Persulfate | Mole Ratio Hydroxide | Broken Viscosity | Break Time |
|---|---|---|---|---|---|---|
| 60 lb/Mgal in 9.1 ppg NaCl brine | 90° F. | 50 lb/Mgal (0.60% w/v) | 1.0 | 0.8 | 3.0 cP | Day 4 (96 hrs) |
| | | | 1.0 | 0.9 | 3.0 cP | Day 3 (72 hrs) |
| | | | 1.0 | 1.0 | 3.0 cP | Day 1 (24 hrs) |

Data in Table 5 shows that at a particular temperature and at a particular persulfate concentration in a brine, the break times can be controlled by adjusting the ratio of persulfate: hydroxide. It also shows that the alkaline activated persulfate mechanism can work to break fluids of xanthan in brines.

CONCLUSIONS

It should be appreciated that the various steps according to the invention can be combined advantageously or practiced together in various combinations to increase the efficiency and benefits that can be obtained from the invention.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention. While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from a to b," or, equivalently, "from approximately a to b," or, equivalently, "from approximately a to b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A method of treating a well, the method comprising the steps of:
   (a) forming a first treatment fluid comprising:
      (i) water; and
      (ii) one or more water-soluble multi-chain polysaccharides, wherein the multi-chain polysaccharides are selected from the group consisting of xanthan, diutan, and derivatives of any of these, wherein the multi-chain polysaccharides are at least a sufficient concentration in the water such that the first treatment fluid has a viscosity of at least 5 cP;
   (b) forming a second treatment fluid comprising:
      (i) one or more water-soluble persulfates; and
      (ii) one or more strong bases;
   (c) introducing the first treatment fluid into the well;
   (d) introducing the second treatment fluid into the well; and
   (e) directing the first treatment fluid and the second treatment fluid to contact each other in a portion of the well at a design temperature less than 100° F.

2. The method according to claim 1, further comprising the steps of:
   (a) after the step of directing the first treatment fluid and the second treatment fluid to contact each other in a portion of the well, allowing the second fluid to break the viscosity of the first fluid in the portion of the well; and then
   (b) flowing back from the well.

3. The method according to claim 1, wherein the step of introducing the first treatment fluid into the well is after the step of introducing the second treatment fluid into the well.

4. The method according to claim 1, wherein the first treatment fluid further comprises proppant or gravel.

5. The method according to claim 1, wherein the step of introducing the first treatment fluid further comprises introducing above the fracture pressure of the subterranean formation.

* * * * *